May 4, 1965 P. B. TUTTLE 3,181,283
MEANS FOR CUTTING CHIP BREAKER GROOVES
Filed Dec. 26, 1962 5 Sheets-Sheet 1

INVENTOR.
Philip B. Tuttle
BY
Woodhams Blanchard & Flynn
ATTORNEYS fig. 6 fig. 7 fig. 8 fig. 9

INVENTOR.
Philip B. Tuttle

INVENTOR.
Philip B. Tuttle

United States Patent Office 3,181,283
Patented May 4, 1965

3,181,283
MEANS FOR CUTTING CHIP BREAKER
GROOVES
Philip B. Tuttle, Brady Township, Kalamazoo County, Mich., assignor to Hammond Machinery Builders, Inc., Kalamazoo, Mich., a corporation of Michigan
Filed Dec. 26, 1962, Ser. No. 246,969
9 Claims. (Cl. 51—218)

This invention relates to means for cutting a chip breaker groove in a metal-cutting tool and it relates particularly to means for cutting a chip breaker groove by use of a face-type grinding wheel.

The use of chip breaker grooves in single-point, metal-cutting tools has long been familiar to workers in the metal-cutting art and such grooves have been formed in single-point tools by a variety of methods and devices and these methods and devices, insofar as I am aware, have utilized peripheral grinding wheels.

Since the cutting edges of single-point tools are normally ground on a face wheel, the necessity for using a peripheral wheel to cut a chip breaker groove in such tools has meant either that a separate and additional machine be available having a peripheral wheel for this purpose or that the user of single-point tools have available a double-ended grinder having a face wheel at one end and a peripheral wheel at the other end, which grinder is, of course, more expensive than a grinder having only a face wheel or a peripheral wheel alone. Both of these alternatives have long been recognized as too expensive for the plant or tool room which grinds but few chip breaker grooves.

Accordingly, the objects of the invention include:

(1) To provide means for cutting a chip breaker groove in a single-point tool which utilizes a grinding wheel of the face-wheel type.

(2) To provide means for cutting a chip breaker groove which comprises a simple tool-holding fixture which can be easily and quickly applied to or removed from the work-holding table of a face-wheel type grinder.

(3) To provide means for cutting a chip breaker groove, as aforesaid, which will primarily be applicable to single-point tools.

(4) To provide means for cutting a chip breaker groove, as aforesaid, which will be applicable to single-point tools of a wide range of sizes and specific shapes.

(5) To provide a fixture for holding a single-point tool in cutting relationship to a grinding wheel such that the face of said grinding wheel is utilized for cutting a chip breaker groove in said tool.

(6) To provide a fixture, as aforesaid, in which the fixture includes means for feeding the tool past the face of the grinding wheel in such a manner as to produce a chip breaker groove of a range of desired lengths, wherein at least a portion of the groove has a straight rearward edge.

(7) To provide a fixture, as aforesaid, in which the fixture includes means for feeding said tool past the face of the grinding wheel in such a manner as to produce a chip breaker groove having any desired angular relationship with respect to the adjacent cutting edge of the tool.

(8) To provide a fixture, as aforesaid, which can be modified to place the chip breaker groove on either the right-hand or the left-hand side of a single-point tool as desired and wherein same may be accomplished merely by rearrangement of the components of said fixture without the need for extra or alternately used parts.

(9) To provide a fixture, as aforesaid, which will be of sufficiently simple construction as to be relatively inexpensive in manufacture and to require relatively little expense in maintenance.

(10) To provide a fixture, as aforesaid, which will be highly versatile, both in its adaptability to a wide variety of specific grinding machines and in its ability to hold a single-point tool in a variety of positions with respect to a grinding wheel as required for grinding chip breaker grooves of a variety of shapes, sizes and positions.

(11) To provide a fixture, as aforesaid, which can, without excessive expense, be made sufficiently sturdy as to remain effective and accurate over a long period of time and which will do so in spite of even relatively rough usage.

(12) To provide a jig for use with said fixture which will render rapid, easy and accurate the placement of the tool on, and with respect to, the fixture in a variety of relative positions to fit different circumstances.

Other objects and purposes of the invention will be apparent to persons acquainted with devices of this general type upon reading the following disclosure and inspecting the accompanying drawings.

General description

In general the invention provides apparatus for cutting a chip breaker groove by a procedure which includes presenting the face of a single-point tool at one edge thereof to the flat face of a face-type grinding wheel, moving said tool toward said grinding wheel until said wheel cuts a groove in said edge of the desired depth and then moving the tool longitudinally parallel with said edge substantially transverse to a radius of said wheel to make the groove of the desired length and to provide the rearward wall of the groove with a straight portion of the desired axial length. Alternately, the tool may be fed with respect to the wheel by a solely longitudinal movement, said tool having been previously placed with respect to the wheel at such a point that the wheel will cut a groove of the desired depth and width therein.

The apparatus of the invention comprises a fixture which can be mounted on the table of a conventional grinding machine and which has a clamp for holding the tool in the desired position. The table-moving mechanism of the grinding machine can be utilized to feed the tool toward the grinding wheel sufficiently to effect the cutting of a groove of the proper depth in the tool. Where it is desired to have a groove having a portion with a straight rearward wall, manually operable means are provided within the fixture for effecting the subsequent feeding step wherein the tool is moved parallel with the edge into which the groove is being cut substantially tangentially with respect to the grinding wheel so as to make the straight portion of the groove of the desired length.

Detailed description

In the following description certain directional terminology will be used but it will be understood that such will be used for illustrative purposes only and it will have no limiting significance. For example, the terms "rightwardly" and "leftwardly" will refer to parts as appearing in the drawings with respect to which such reference is made, provided that when no specific reference to a drawing appears the directions will be taken as the directions appearing in FIGURE 5. The terms "forward" and "rearward" will refer to directions, respectively, toward and away from the operator in the normal position for operating the apparatus. Thus, the side under the crank handle in FIGURE 5 will be referred to as the forward side of the fixture whereas the side opposite same will be referred to as the rearward side. The terms "upward" and "downward" will refer to such directions taken with the apparatus in its normal position of use. The terms "outward" and "inward" will refer to directions toward and away from the geometric center of the fixture. Such terminology also will include derivatives of the words above specifically mentioned as well as words of similar import.

Dealing first with the method to be performed by the apparatus of the invention, attention is called to FIGURES 1 to 4, inclusive, wherein there is indicated at 1 a fragment of a conventional grinding wheel carrying suitable abrasive material on its face 2. A single-point tool 3, here shown as a straight tool having a carbide insert 4, has a flank 5 and a face 6. The apparatus of the invention is utilized to cut a chip breaker groove 7 in said face above said flank whereby a side cutting edge 8 is formed. For this purpose, the tool is first positioned with its face 6 substantially parallel and partially overlapped with the abrasive face 2 of said grinding wheel as shown in broken lines in FIGURE 2. The tool is then moved in a direction perpendicular to the face 6 thereof and toward the face of the grinding wheel, in the direction indicated by the arrow A (FIGURE 2), until the wheel face 2 cuts into the tool face 6 to a depth equal to the desired depth of the chip breaker groove as shown in solid lines in FIGURE 2. When such depth is attained, the tool may then be moved in a direction parallel with the face 6 and parallel with the edge of the tool in which the chip breaker groove is to be formed, which in this instance is longitudinally of the tool, and the grinding wheel continues to cut the metal to a uniform depth.

Thus, there is formed a chip breaker groove 7 of the desired depth and the desired length along a selected edge and having the desired amount of uniform and straight edges and planar surfaces.

The apparatus by which this is accomplished is disclosed in FIGURES 5 to 14, inclusive, and it comprises a fixture 11 which can be mounted on the table 13 of a standard grinding machine 12, such as that disclosed in U.S. Patent No. 2,922,258, and which may be of either conventional or electrolytic type. The tool is reciprocable on and by said fixture in a direction parallel with its lengthwise extent and perpendicular to the plane of the table 13. Said table is movable toward and away from the grinding wheel by any conventional work-feeding means, not shown, and which may be manually actuated as shown in U.S. Patent No. 2,922,258 or power actuated as shown in U.S. Patent Nos. 2,988,858 or 2,988,862.

The fixture 11 is comprised of a base plate 16 which overlies an undercut groove 17 in the table 13 and said base plate is slidable lengthwise along said groove. A clamp structure 18 of any suitable and conventional type, having an operating handle 19, rides in a slot 18a (FIGURE 6) in the base plate 16 and is provided for releasably locking the base plate 16 in fixed position on and with respect to the table 13. Since clamp structures for this purpose are well known to the trade and since various types of clamp structures can be used for this purpose, a detailed disclosure thereof is believed to be unnecessary and has been omitted. An at least partially cylindrical post 15 is fixed to the bottom of the base plate 16 such that its central axis may for the sake of convenience in use lie in the plane of the face 49 described hereinbelow whereby said post acts as a pivot axis when the base plate 16 is rotated on the table 13. Said post in the illustrated embodiment has a minor chordal segment removed therefrom to clear the clamp structure 18 in order to eliminate interference therebetween. The base plate 16 has an elongated slot 21 (FIGURE 6) therethrough adjacent its rightward end extending transverse to the table groove 17 and a suitable connection means 20, such as a spring-loaded friction key comprised of a bolt 20a, a spring 20b, and a nut 20c cooperating with said slot 21 and the table groove 17 to restrain the rightward end of the base plate 16 from unintended movement on the table 13 while the clamp structure 18 is unclamped. The slot 21 and the connection means 20 riding therein permit arcuate movement of the base plate 16 with respect to the table 13 about an axis passing perpendicularly to the table through the axis of the post 15 for reasons pointed out hereinbelow.

A stationary post 22 (FIGURE 14) is rigidly secured to the base plate 16 and extends upwardly therefrom. The post 22 has an enlarged recess 23 in its upper end an a pin 24 is mounted on said post and projects into said recess. The post 22 also has an opening 26 which extends through the lower end thereof and which communicates with the recess 23.

Figure 14:
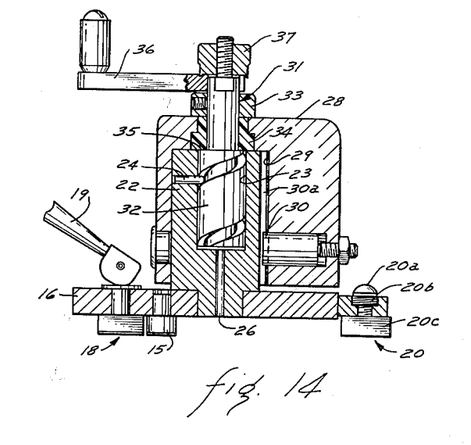
FIGURE 14 is a sectional view taken on the line XIV—XIV of FIGURE 10.

A block or housing 28 has a central opening 29 into which the upper end of the post 22 is received. The block 28 is vertically movable with respect to the post 22 but is held against rotation with respect thereto by a key 30 and keyway 30a. An elevating mechanism 31 is rotatably supported on the block 28 and it comprises a threaded lower portion 32 which is received within the recess 23 and which is rotatable therein. The pin 24 extends between the threads of the threaded portion 32 so that rotation of said threaded portion effects vertical movement thereof with respect to the post 22. The elevating mechanism 31 has a shoulder 35 and a collar 33 which are disposed on opposite sides of a bushing 34 in the block 28 whereby vertical movement of the elevating mechanism effects corresponding movement of the block 28 with respect to the base plate 16. A manually operable crank handle 36 is secured to the elevating mechanism 31 by a lock nut 37 whereby rotation of said elevating mechanism can be effected. Said handle may be removed from said mechanism and be replaced at a position 180 degrees away therefrom to avoid interference with the wheel 1 when grinding tools of the opposite hand. Thus, by rotating the handle 36, the elevating mechanism 31 is rotated and the block 28 is moved vertically with respect to the base plate 16.

A stop structure 41 (FIGURE 7) is provided in order to limit movement of the block 28 toward the base plate 16. The stop structure 41 comprises a manually rotatable rod 42 which extends upwardly from and which is rotatably supported by the base plate 16. The rod 42 has an enlarged head 43 at its lower end. The head 43 has the cross-sectional shape of a major segment of a circle and has a plurality of circumferentially spaced, vertically offset or stepped surfaces, here three surfaces 44, 46 and 47, and a chordal wall 45. The surfaces 44, 46 and 47 are adapted, by appropriate rotation of the rod 42, to be disposed alternately between the lower edge of the block 28 and the upper surface of the base plate 16 to thereby limit downward movement of said block. Further, the rod 42 can be positioned so that the chordal wall 45 of the head 43 is disposed parallel with a leftward side wall 49 (FIGURE 7) of the block 28 in which case the block can move into contact with the base plate 16. The lowermost position which the block 28 can assume with respect to the base plate 16 can therefore be selected by placing the appropriate one of the surfaces 44, 46 and 47 under the lower edge of said block, or by placing the chordal wall 45 in parallelism with the leftward side wall 49 of the block 28. Thus, there are four alternately available lowermost positions of the block 28 with respect to the base plate 16 and such are selected by manual rotation of the rod 42. In this fashion the maximum length of the chip breaker groove can be determined by appropriate rotational positioning of the rod 42 as will be pointed out in greater detail hereinbelow.

A pair of guides 51 and 52 (FIGURE 7) are mounted on the forward side 53 of the block 28 adjacent the lower edge thereof and close to the opposite ends thereof. A rotatable clamping cam 54 is rotatably supported upon the forward side 53 adjacent to the upper edge thereof and above the guide 52. A handle 56 is connected to the cam 54 for effecting pivotal movement thereof. Corresponding guides 51a and 52a and a cam 54a having a handle 56a are mounted upon a rearward side 57 of the block 28 and in lateral alignment with their counterparts on the side 53. The arrangement is such that the position of the sides 53 and 57 with respect to the face 2 of the grinding wheel 1 can be reversed so that both right-hand and left-hand single-point tools can be ground simply by placing the appropriate one of the sides 53 and 57 adjacent to the grinding wheel. The guides 52 and 52a are preferably eccentrically mounted on the block 28 so that their effective position thereon may be varied by rotation thereof as desired and for purposes appearing hereinafter.

A support plate 60 is mounted on the guides on the side of the block 28 adjacent the grinding wheel, here on the guides 51a and 52a on the side 57 of the block 28. The plate 60 has a substantially arrowhead-shaped extension 61 (FIGURE 11) offset sidewardly therefrom and integral therewith. A pair of undercut grooves 62 and 63 are provided between the plate 60 and the extension 61 and said grooves converge toward one end of said plate as is best shown in broken lines in FIGURE 11. The cam 54a and the guide 52a are receivable in said grooves 62 and 63, respectively. A pair of further grooves 64 and 65 are provided adjacent the other end of said plate 60 and the guide 51a is received in a lowermost one 65 thereof. If the position of the plate 60 were to be reversed so that it would be mounted adjacent the side 53 of the block 28, the plate 60 also would be inverted so that the guide 51 would be received in groove 64, guide 52 would be received in groove 62 and cam 54 would be received in groove 63.

Figure 11:
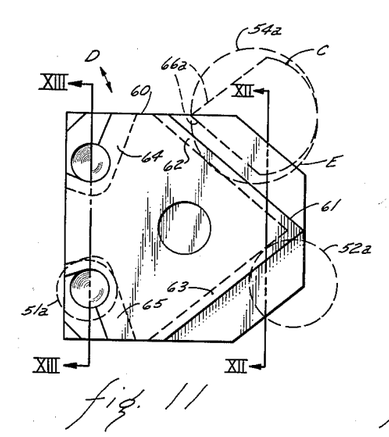
FIGURE 11 is an elevational view of that surface of the clamp which engages the supporting block of the apparatus and showing in broken lines the guides and two positions of the clamping cam.
Figure 12:
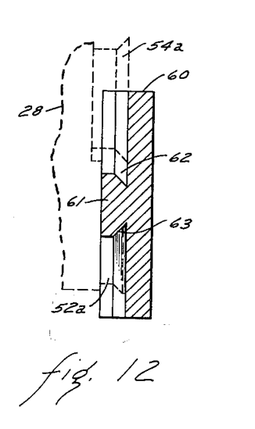
FIGURE 12 is a sectional view taken on the line XII—XII of FIGURE 11.
Figure 13:
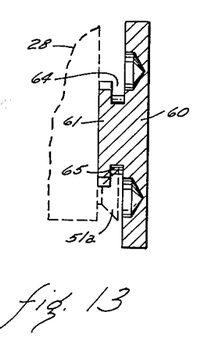
FIGURE 13 is a sectional view taken on the line XIII—XIII of FIGURE 11.

The cams 54 and 54a are identical and they have the shape of a major segment of a circle. They have chordal edges 66 and 66a and each said chordal edge clears the edge of the extension 61 when the cam is in its non-clamping position indicated at C in FIGURE 11. In such position, the plate 60 can be removed from or placed on the block 28 by moving same in the appropriate one of directions indicated at D (FIGURE 11). When cam 54 or 54a is moved into its clamping position as indicated at E (FIGURE 11) the peripheral edge thereof will force plate 60 against the guides 51 and 52, or 51a and 52a, whereby said plate will be rigidly clamped onto the block 28. Adjustment of the guide 52 (or 52a) on its eccentric mounting enables the plate 60 to be secured to the block 28 so that the edge of said plate adjacent the grooves 64 and 65 may be parallel or at an angle (as shown in FIGURES 5 through 10) to the leftward face 49 of the block 28 as desired. The plate 60 in effect is pivoted about the guide 51 (or 51a) by adjustment of the guide 52 (or 52a). For the sake of convenience of operation, the plate 60, when secured to the block 28 so that the aforementioned surfaces of said block 28 and plate 60 are parallel, also has its edge surface adjacent the grooves 64 and 65 coplanar with the surface 49 of the block 28 (FIGURE 6).

A tool holder 71 is mounted on the plate 60 on the side thereof opposite the extension 61. The holder 71 is comprised of a base block 72 which is pivotally secured in any convenient manner (not shown) to the plate 60 and which has a pair of spaced ears 73 and 74 projecting away therefrom. A clamp arm 76 is pivotally supported by and between the ears 73 and 74 by a pivot pin 77 (FIGURE 6). A clamp-adjusting stud 78 extends through the clamp arm 76 and is pivotally fixed by a headed portion 78a into the plate 60. It has a threaded outer end at 78b to receive the knurled nut 79. A spring 81 (FIGURE 6) encircles the stud 78 and bears at its respective ends against the base block 72 and the underside of the clamp arm 76 whereby said arm is continuously maintained in engagement with the nut 79. Thus, the free end of the clamp arm 76 can be moved by adjustment of the nut 79 toward and away from the plate 60 in order to firmly grip the tool 3 therebetween.

*Operation*

The operation of the apparatus has been indicated before but same will be repeated briefly to insure a complete understanding of the invention.

The tool 3 is mounted on the fixture 11 by placing same between the plate 60 and the free end of the clamp arm 76 and then tightening the clamp adjusting nut 79 until the tool is firmly gripped. Mounting of the tool on the plate 60 usually is performed when the plate 60 is removed from the block 28. In such case, the plate 60 is then placed on the guides 51a and 52a and then the cam 54a is rotated to clamp the plate into position onto the block 28. Alternatively, in appropriate cases the tool can be mounted upon the plate 60 while said plate is fixed to the block 28.

The fixture 11 is moved along the groove 17 on the table until the tool 3 is positioned with respect to the face 2 of the grinding wheel 1 so that a chip breaker groove of the desired width will be cut in the face 6 of the said tool. The fixture 11 may be adjusted in various positions along the table groove 17 by releasing the clamp 18 and moving said fixture lengthwise along the table slot. Thereafter, the fixture is locked into position by retightening of the clamp structure 18.

The foregoing operations normally will be carried out while the table 13 is backed off from the grinding wheel 1.

Figure 1:
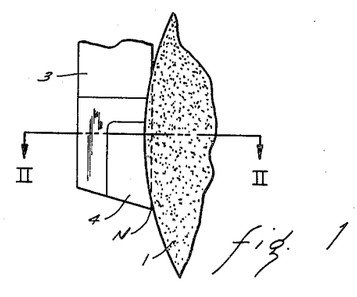
FIGURE 1 is a diagrammatic view showing the position of a single-point tool with respect to a face-type grinding wheel at the commencement of the cutting operation.
Figure 2:
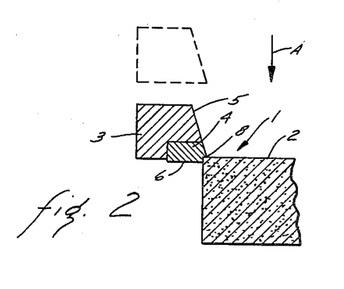
FIGURE 2 is a sectional view taken on the line II—II of FIGURE 1.
Figure 3:
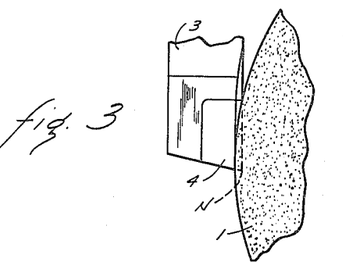
FIGURE 3 is a diagrammatic view similar to FIGURE 1 but showing the relationship of the parts with respect to each other at an advanced point in the process of cutting the chip breaker groove.
Figure 4:
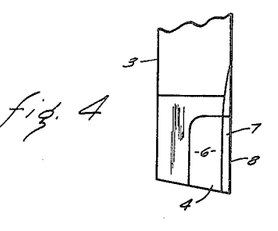
FIGURE 4 is a plan view of a single-point tool having a chip breaker groove cut therein by the method and apparatus of the invention.

Then the block 28 is elevated by rotation of the handle 36 until the nose N of the tool 3 is in the proper vertical position with respect to the wheel 1, substantially as shown in FIGURE 1. The maximum axial length of the chip breaker groove can be conveniently determined by manipulating the rod 42 to place one of the surfaces 44, 46 and 47 between the lower edge of the block 28 and base plate 16 or by placing the chordal edge 45 in parallel with the left side wall 49 of the block 28, in which case the block 28 can move into contact with the base plate 16. The table 13 is then moved by the work feeding means toward the face 2 of the grinding wheel 1 until the face 6 of the tool is engaged by said wheel face 2 and a groove of the desired depth is cut in said tool face 6 at the proper distance from the end of the tool to provide a groove of the desired length. The table is then held stationary for the remainder of the operation.

Formation of the chip breaker groove is completed by rotating the handle 36 and thereby moving the block 28 upwardly until the chip breaker groove extends through the end of the tool where said groove is along a side edge thereof or through a side of the tool where the groove extends across an end thereof.

Although the above procedure is desirable because it causes a minimum of wear on the edge of the wheel 1, it is also possible to begin cutting a lower point on the tool and lower the tool to the end of cut position if desired.

If a tool of opposite hand is to be ground, the fixture 11 is removed from the table groove 17 and is turned around so that side 53 of block 28 is adjacent the grinding wheel. The fixture 11 is then placed in the table groove 17 and is properly positioned therein for the grinding operation. In such case the fixture is positioned adjacent the leftward side of the grinding wheel, rather than the rightward side as appearing in FIGURE 1. The rest of the grinding operation is the same as that previously described.

Figure 16:
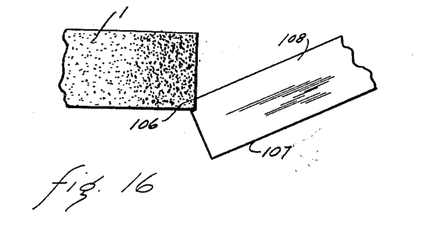
FIGURE 16 is a top view of a tool having a chip breaker groove ground in an angle in the end thereof.

While the invention has been described above in connection with the making of chip breaker grooves which have bottom and side surfaces parallel to the bottom of the tool and the direction of tool travel, respectively, it will be apparent that the apparatus can be used to form grooves otherwise oriented on the tool. Such can be done by releasing the clamp structure 18 associated with the slot 18a, rotating the base plate 16 about an axis perpendicular to the table 13 and defined by the post 15 to whatever extent is desired until the face of the tool is presented in the desired angular relationship to the face of the grinding wheel. The base plate 16 can then be locked in such relationship and the foregoing described operations carried out. In such cases, the groove can be shaped to have a progressively increasing or progressively decreasing depth in a direction away from the cutting edge as is generally indicated with respect to a tool 108 in FIGURE 16. Such an angled cut may be made either where said chip breaker groove lies transverse to the longitudinal axis of the tool 108 or where the chip breaker groove extends longitudinally of the tool.

Further, the support plate 60 may be oriented so that its leading edge is at selectable angles, perpendicular or otherwise, to a horizontal radius of the grinding wheel by rotation of the appropriate guide 52 or 52a and whereby the tool 3 may be placed in the same standardized position on the plate 60 regardless of the angle required. This may be necessary where the cutting edge of the tool or the chip breaker groove to be formed extends at an angle to the lengthwise axis of the tool as is the case, for example, with lead angle tools. Also, positioning of the tool other than at an angle perpendicular to a horizontal radius of the wheel may be necessary where the width of the chip breaker groove is to be varied along the lengthwise extent of said groove. If desired, the support plate 60 may be maintained in a constant position on the block 28 and the tool 3 may be shifted on said plate to provide the required angular adjustment.

In certain circumstances it may be desired to grind the chip breaker groove without effecting movement of the table 13. In such case the block 28 can be positioned so that the nose of the tool 3 is above the grinding wheel adjacent the periphery thereof. The chip breaker groove can then be formed by solely a downward movement of the block 28.

Figure 15:
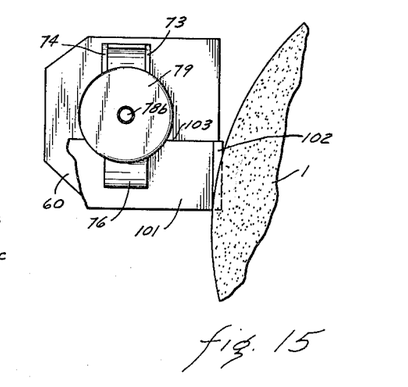
FIGURE 15 is a segment of FIGURE 9 showing a clamping arm and tool in a different position.

Should it be so desired, the apparatus of this invention may be used to cut a chip breaker groove in the axial end of a tool such as the tool 101 of FIGURE 15. In this case, the clamp arm 76 is rotated 90 degrees in a counterclockwise direction from its position of FIGURE 9 and the tool to be ground is clamped thereunder by means of the clamp adjusting nut 79 in a horizontal position as indicated. The chip breaker groove 102 may then be cut as discussed hereinabove in connection with other orientations of a chip breaker groove. Should it be so desired, the chip breaker groove 102 may be cut an angle other than 90 degrees to an upper side 103 of the tool 101 by moving the tool 101 from its horizontal position shown in FIGURE 15. Such movement may be accomplished by moving the tool 101 with respect to the support plate 60 or by moving the support plate 60 with respect to the block 28 through adjustment of the effective radius of the guide 52 by rotation of said guide.

Figure 17:
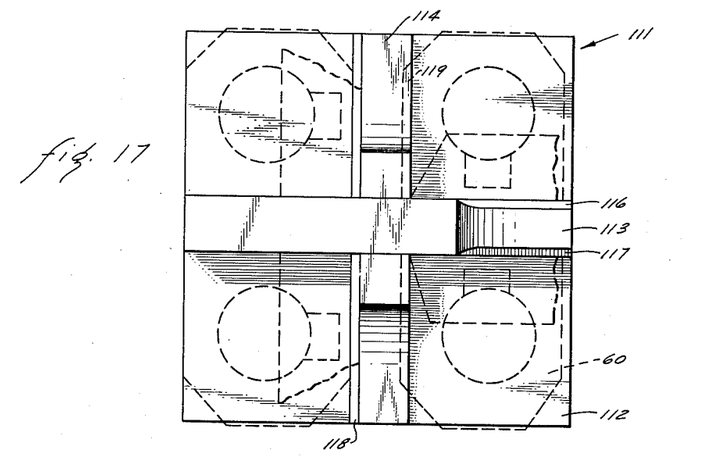
FIGURE 17 is a top view of a tool alignment jig.
Figure 18:
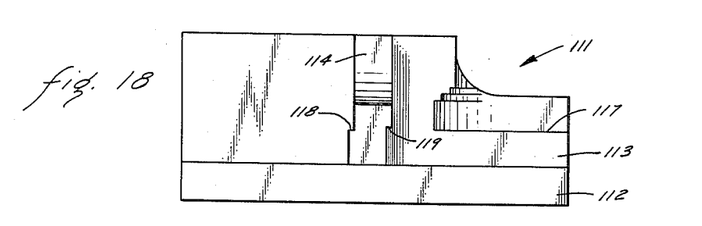
FIGURE 18 is a front view of a tool alignment jig of FIGURE 17.
Figure 19:
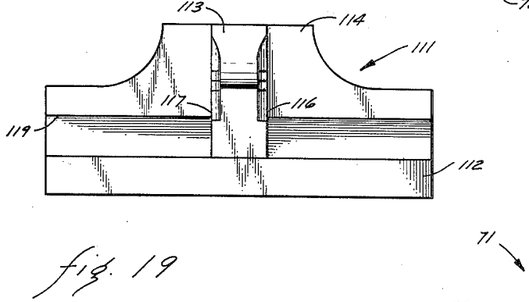
FIGURE 19 is a right side view of the tool alignment jig of FIGURE 17.
Figure 20:
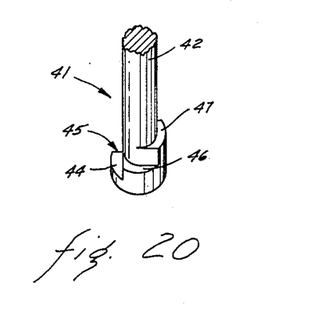
FIGURE 20 is an oblique, partially broken, view of the stop mechanism of said fixture.
Figure 21:
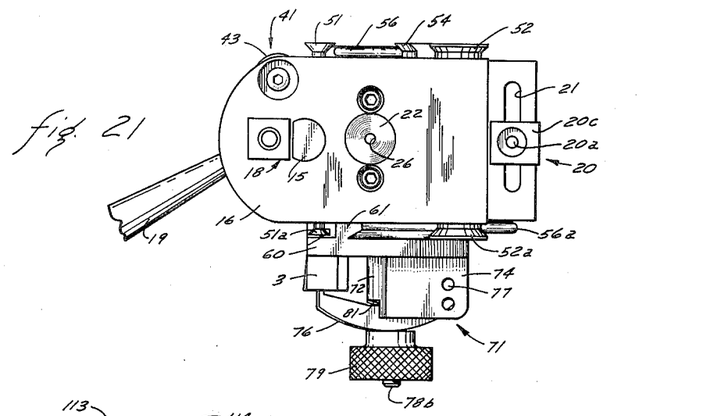
FIGURE 21 is a bottom view of the fixture of FIGURE 6.
Figure 22:
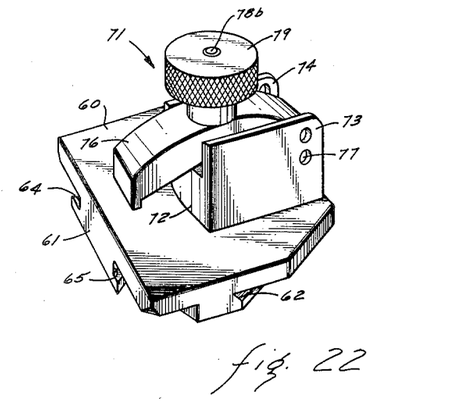
FIGURE 22 is an oblique view of the holder of said fixture.

In cases where it is advantageous that the relative placement of a tool 3 and the support plate 60 should be precisely reproducible, such as when several identical tools are to be cut with several identical chip breaker grooves or when it is desired that the placement of the tool on the support plate 60 is to be standardized to a few precisely known, permitted positions, it may be desired to use a jig in fastening the tool to the support plate 60. The jig 111 as indicated in FIGURES 17, 18 and 19 is a preferred embodiment of such a jig. The jig 111 is here shown as comprising a flat, essentially square, base plate 112 bisected by an upstanding, generally rectangular fence 113 which runs parallel to a pair of sides defining the base plate 112 and which is fastened thereto by any convenient means, such as screws, not shown. The base plate 112 is also bisected by a second fence 114 of length equal to that of the base plate 112, parallel to the remaining pair of edges thereof, and which perpendicularly bisects the fence 113. The fence 114 is here shown to be comprised of two identical pieces separated by said fence 113. The fences 114 and 113 preferably divide the base plate 112 into four equal areas, each of which approximates the area of the support plate 60.

The height of the fences 113 and 114 may be diminished toward the ends thereof for convenience in use if desired. The fence 113 has on the rightward end thereof, as seen in FIGURES 17 and 18, a pair of upwardly facing ledges 116 and 117 positioned on either side thereof and spaced above the base plate 112 a distance slightly less than the thickness of the support plate 60. The fence 114 has on the leftward side thereof an upwardly facing ledge 118 and on the rightward side thereof a downwardly facing ledge 119, both of which run effectively throughout the length of said fence 114. The ledge 118 is preferably at a height above the base plate 112 slightly less than the thickness of the support plate 60 and the ledge 119 is at a height above the base plate 112 slightly greater than the thickness of the support plate 60.

Figure 5:
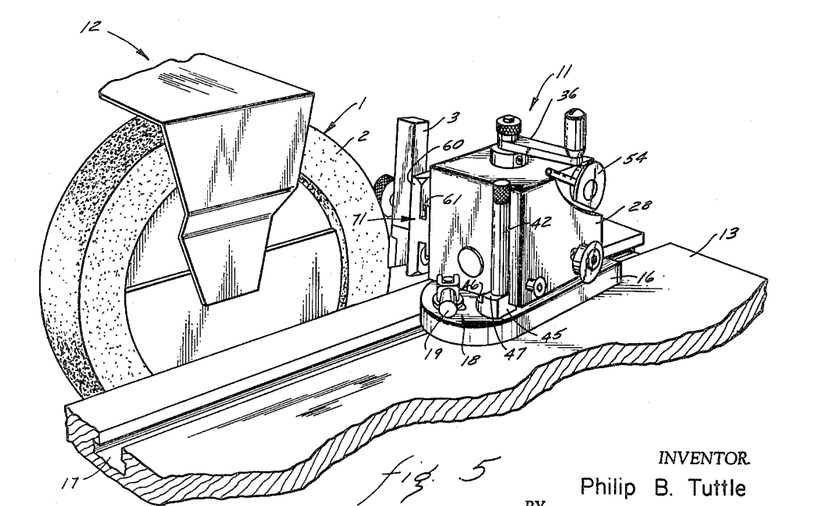
FIGURE 5 is an oblique view of a conventional face-type grinder in association with a fixture embodying the invention.
Figure 6:
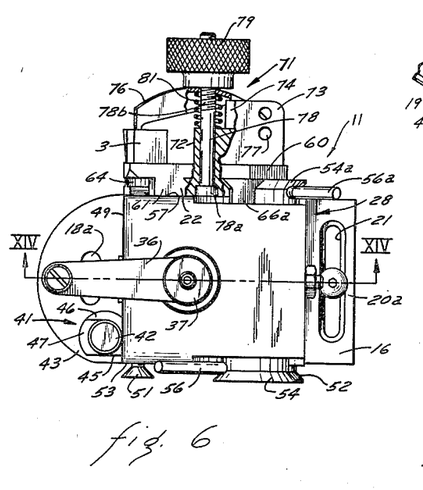
FIGURE 6 is a top view of said fixture.
Figure 7:
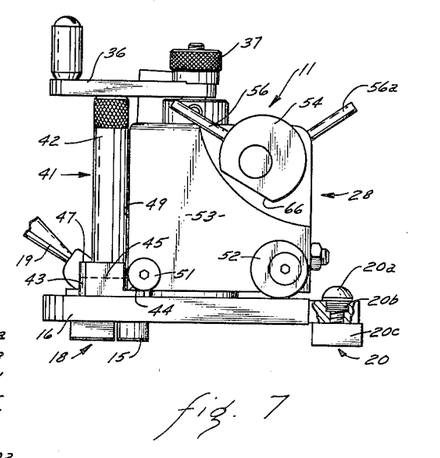
FIGURE 7 is a front elevational view of said fixture.
Figure 8:
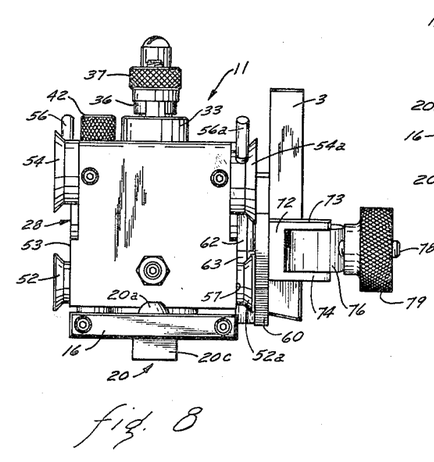
FIGURE 8 is an end elevational view of said fixture taken from the rightward end of FIGURE 6.
Figure 9:
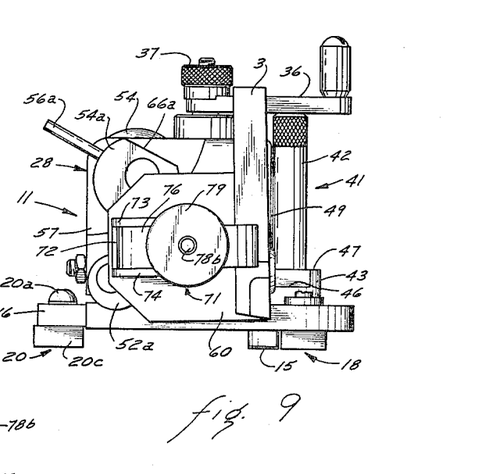
FIGURE 9 is a rear elevational view of the fixture showing the side opposite that appearing in FIGURE 7.
Figure 10:
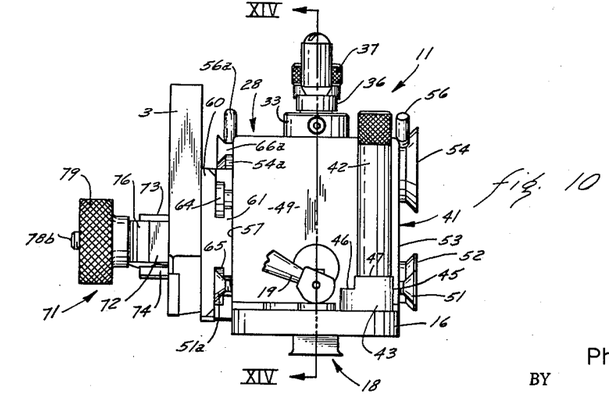
FIGURE 10 is an end elevational view of the fixture showing the end opposite that appearing in FIGURE 8.

Should it be desired to attach the support plate 60 to the side 57 of the block 28 and to cut a chip breaker groove in a longitudinal edge of the tool 3 as is shown in FIGURE 5, the support plate 60 may be placed on the base plate 112 of the jig 111 in the upper right-hand quadrant thereof as seen in FIGURE 17 whereby the narrow side of the support plate 60 is away from the fence 113. The side of the support plate 60 adjacent the fence 114 slides under the downwardly facing ledge 119 so that said side of the support plate 60 is in continuous contact with fence 114 and so that the side of the support plate 60 adjacent the fence 113 is in continuous contact therewith. The tool to be ground is placed on the support plate 60 so that the end to be ground is adjacent the fence 114 and so that one side of said tool is adjacent the fence 113. When the tool is thus properly positioned, the knob 79 is rotated to secure the tool 3 to the support plate 60 and said support plate may now be mounted on the block 28.

Should it be desired to grind a chip breaker groove of the opposite hand in a longitudinal edge of a tool 3 such that the support plate 60 is to be located on the face 53 of the block 28, said support plate and tool are placed on the lower right-hand quadrant of the jig 111 and the tool is secured to the support plate 60 in the manner above described.

Placement of the tool on the support plate 60 wherein a chip breaker groove is to be cut in the end of said tool and wherein the side 57 of the block 28 will support the support plate 60, the lower left-hand quadrant of the jig 111 as seen in FIGURE 17 is employed to locate the tool on the support plate 60. Similarly where the side 53 is to be employed the upper left-hand quadrant of the jig 111 of FIGURE 17 is employed.

It will be seen that where the chip breaker groove is to be cut into the end of the tool that the jig 111 maintains the end of the tool even with an edge of the support plate 60 and maintains the outboard side of said tool at a distance slightly spaced from and outward from the side of the support plate 60. It will be noted that in each of the four quadrants that the edge of the tool along which the chip breaker groove is to be cut is oriented to coincide with an edge of the support plate 60. The ledges 18 and 19 act to space the tool differently on the support plate 60 for an axial breaker groove whereby to place the tool more advantageously with respect to the wheel 1 of FIGURE 5. Although the preferred use of the quadrants is given above, an end breaker groove quadrant may be used to position an axial breaker groove tool and an axial quadrant may be used to position an end cut breaker groove tool if desired.

It will further be noted that the edge of the tool to be cut is coplanar with the leading edge of the support plate 60 when the jig 111 is used in the preferred manner and when the support plate 60 is installed on the block 28 so that its leading edge is vertical, said leading edge is also coplanar with the leftward face 49 of the block 28. Thus, when the leading edge of the support plate 60 is vertical and when the jig 111 is used to position the tool thereon in the preferred manner, the edge of the tool to be cut will be coplanar with the leftward face 49 of the block 28, said standardized location of the tool with respect to the block 28 thus adding greatly to the convenience with which a chip breaker groove may be ground in a single point tool.

While a particular, preferred embodiment of the invention has been described above, the invention contemplates such changes or modifications therein as lie within the scope of the appended claims.

What is claimed is:

1. A fixture for supporting a workpiece in association with a grinding wheel, comprising:
   a base adapted to be stationarily mounted in a fixed position, said base having a post extending upwardly therefrom, said post having a central recess in the upper end thereof and a stationary pin extending into said recess;
   a housing mounted above said base, said housing having a central compartment within which said post is received;
   a manually rotatable screw mounted on said housing and extending into said recess, said screw having external threads, said pin being received between said threads whereby rotation of said screw will effect reciprocating movement of said screw and said housing toward and away from said base; and
   a tool holder mounted on said housing for movement therewith.

2. A fixture for supporting a workpiece in association with a grinding wheel, comprising:
   a base adapted to be stationarily mounted in a fixed position;
   a housing mounted above the base and cooperating parts on said base and said housing whereby said housing is supported for reciprocating movement toward and away from said base and means for effecting such movement; a tool holder mounted on said housing for movement therewith, said tool holder comprising a clamp plate mountable on said housing, a tool clamp mounted on said clamp plate, a pair of guides mounted on said housing for engaging and supporting said clamp plate near the opposite ends thereof adjacent to the lower edge thereof and a rotatable clamping cam on said housing engageable with said clamp plate near the upper end thereof for urging same against said guides whereby said clamp plate is releasably locked in place on said housing.

3. A fixture for supporting a workpiece in association with a grinding wheel having a working surface comprising:
   a base adapted to be stationarily mounted in a fixed position;
   a housing mounted above the base and cooperating parts on said base and said housing whereby said housing is supported for reciprocating movement toward and away from said base and means for effecting such movement;
   a tool holder mounted on said housing for movement therewith, said tool holder comprising a clamp plate mountable on said housing and a tool clamp mounted on said clamp plate;
   clamping means on said housing for releasably locking said clamp plate on said housing;
   said clamp plate having mutually perpendicular sides defining at least two adjacent corners of right angle shape and said clamping means is arranged to hold a tool having an edge so that the edge is parallel with one of said sides adjacent to one of said corners, the side between said corners constituting a guide side and being mountable coplanar with that face of said housing which is perpendicular to and nearest to the working surface of said grinding wheel and parallel to the direction of reciprocating movement of the housing.

4. A fixture according to claim 3, including a jig comprising a base plate, a pair of walls perpendicular to each other and perpendicular to said base plate dividing the upper surface of said plate into four approximately equal areas, and means defining offsets in certain of said walls, said offsets being spaced from said upper surface a distance approximately equal to the thickness of said clamp plate for offsetting the tool with respect to said clamp plate in certain settings thereof while maintaining the tool flush with said guide side in other settings thereof.

5. A fixture for supporting a workpiece in association with a grinding wheel, comprising:
   a base adapted to be mounted in association with a grinding wheel;
   a housing mounted above the base and cooperating parts on said base and said housing whereby said housing is supported for reciprocating movement toward and away from said base and means for effecting such movement;
   a tool holder mounted on said housing for movement therewith;
   a shiftable stop structure having a plurality of vertically spaced stop surfaces alternatively positionable between said housing and said base for limiting movement of said housing toward said base whereby the lowermost position of said housing with respect to said base can be adjusted.

6. A fixture for supporting a tool in association with a grinding wheel, comprising:
   a base adapted to be mounted in association with a grinding wheel;
   a housing mounted above said base and cooperating parts on said base and said housing whereby said housing is supported for reciprocating movement toward and away from said base and means for effecting such movement, said housing having a pair of upright opposite side walls each having guiding and clamping means thereon, the guiding and clamping means on the opposite side walls being identical and arranged in mirror image relationship;
   a tool holder mountable on one or the other of said side walls in engagement with said guiding and clamping means thereof for being releasably held in fixed position thereby whereby said tool holder can be mounted in association with the grinding wheel where either of said side walls is positioned adjacent the grinding wheel whereby tools of opposite hand can be ground.

7. A fixture for supporting a workpiece in association with a grinding wheel, comprising:
   a base adapted to be mounted in association with a grinding wheel;
   a housing mounted above the base and cooperating screw and screw follower means on said base and said housing supporting said housing for reciprocating movement toward and away from said base and manually operable means for rotating said screw, said housing having a central internal opening in which said screw and screw follower means are located, said housing having an upright outer wall with guide means and clamp means mounted thereon;
   a tool holder engaged with said guide means and releasably secured to said outer wall by said clamp means.

8. A fixture according to claim 7, in which said tool holder comprises a support, a clamp arm pivotally connected at one end thereof to said support, the other end of said clamp arm being disposed in opposing relation to said support so that a workpiece can be gripped therebetween, a threaded stud extending through the central region of the arm and secured to said support, and a nut threaded on said stud and bearing against said clamp arm for urging same toward said support.

9. A fixture according to claim 7 in which said guide means includes an eccentric pivotally mounted on the housing and engageable with the tool holder so that the angle which the tool holder makes with respect to the housing can be adjusted by adjusting the position of the eccentric.

References Cited by the Examiner
UNITED STATES PATENTS

| | | | |
|---|---|---|---|
| 427,477 | 5/90 | Lawles | 51—122 |
| 843,725 | 2/07 | Wheatman | 51—224 |
| 1,216,600 | 2/17 | Paschall. | |
| 1,268,961 | 6/18 | Gorham | 51—92 |
| 1,538,174 | 5/25 | Davis | 51—218 |
| 2,183,686 | 12/36 | Miller | 51—122 |
| 2,417,729 | 3/47 | Bazley | 51—122 |
| 2,432,058 | 12/47 | Wiken et al. | 51—224 |
| 3,067,551 | 12/62 | Maginnis | 51—281 |
| 3,071,904 | 1/63 | Delafontaine | 51—281 |

LESTER M. SWINGLE, *Primary Examiner.*